INVENTOR.
Myron L. Anthony, 3,161,951
AUTOMATIC TOOL HANDLING APPARATUS
Myron L. Anthony, La Grange, Ill., assignor to Scully-Anthony Corporation, La Grange, Ill., a corporation of Illinois
Filed Sept. 17, 1962, Ser. No. 224,058
18 Claims. (Cl. 29—568)

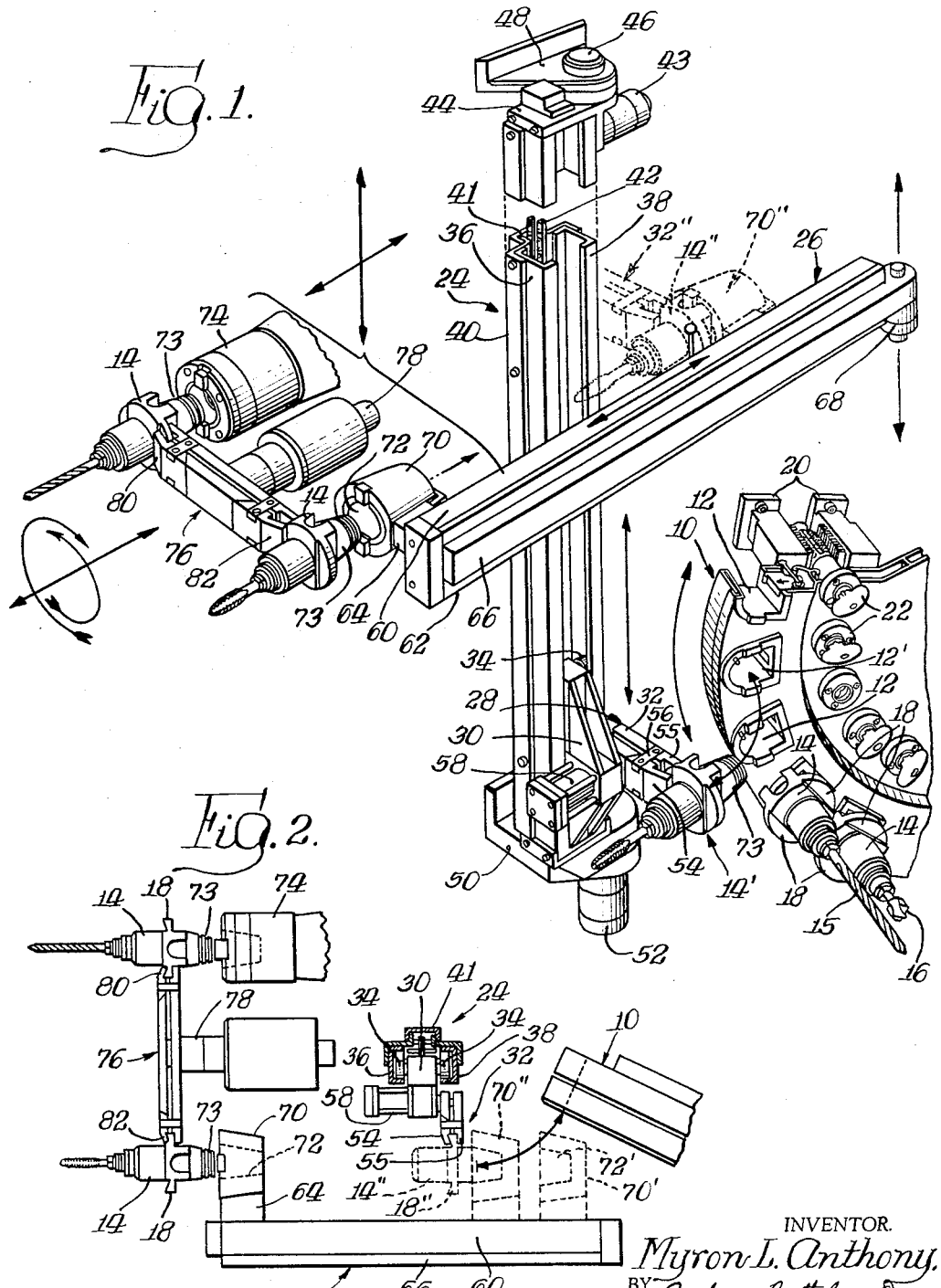

The present invention relates to automatic tool handling apparatus adapted to be employed in conjunction with a machine tool to automatically transfer a plurality of tools seriatim from a storage area to a spindle or work station and subsequently back again to the storage area, such apparatus being especially suited for use in conjunction with data controlled machine tools.

More specifically, the invention relates to shuttle mechanism for transferring a newly selected tool from a storage matrix to an intermediate tool transfer position from which it may be taken by tool exchange means and exchanged with an old tool in an associated machine tool spindle, the shuttle mechanism also being adapted to return the old tool to the storage matrix. The shuttle mechanism of the present invention is particularly useful in conjunction with machine tools of the type having a movable head, for example, where the machine tool spindle is mounted on a head which is movable vertically or horizontally or in both such directions.

Various types of apparatus have previously been developed for automatically transferring tools between a storage member and a machine tool spindle. The tool changing systems heretofore developed for use with machine tools of the type having a stationary head comprise various forms of mechanism for taking a tool from a storage matrix or the like and moving it to a predetermined position in alignment with the machine tool spindle, whereby it may be inserted into the spindle. Rotatable arms are commonly utilized to remove the old tool from the spindle and insert the new tool therein. In such instances, where the machine tool spindle is mounted on a stationary head, the tool transfer mechanism is adapted to take a newly selected tool to the same predetermined tool transfer position during each tool changing operation.

Referring now to the tool changing systems previously developed for use in conjunction with machine tools having a spindle mounted on a movable head, such systems are generally one of two basic types. In accordance with one type of system, the tool transfer mechanism carries a newly selected tool to a predetermined tool transfer position, which is the same for every tool changing operation, and in such instances the head of the machine tool must be moved from whatever position it may be in at the time to a home position or predetermined reference position in order to effect a tool changing operation. In the second known type of tool changing system referred to above, the tool storage member is mounted on the head for movement therewith, and in such instances the tool transfer mechanism is adapted to produce the same tool transfer motions regardless of the head position, since the machine tool spindle, the tool storage matrix, and in fact the entire tool changing system, moves with the head, so that the relative positions of the various system components are unchanged.

The foregoing tool changing systems heretofore adapted for use with machine tools of the movable head type are subject to certain serious disadvantages. For example, if in order to carry out a tool changing operation, it is always necessary to return the movable machine tool head to a predetermined home or zero reference position, the time required to effect tool changing is increased so substantially such systems become impractical. Consequently, present commercial tool changing systems are commonly of the second type mentioned above, where the tool storage matrix is mounted on the head for movement therewith. However, the latter type of system is also undesirable for a number of reasons, as will be discussed hereinbelow.

A tool storage matrix when loaded with a supply of tools may weigh several thousand pounds, and to provide a machine tool with a movable head which must carry with it a tool storage matrix of such great bulk is a difficult and expensive task. Furthermore, a tool storage matrix is usually rotatable in order to bring a selected tool into a transfer position, and the rotation of such a large mass may tend to cause an unbalance which will produce minor variations in the position of the head on which it is mounted, and thereby affect the accuracy of a machining operation. In addition, where the tool matrix moves with the head, it will not always be accessible for the changing of the tools stored therein. It will also be readily understood that where it is necessary to mount the tool matrix on the head, considerable limitations are imposed on the size and weight of the matrix, and difficulties are encountered in positioning the matrix so that it will not interfere with other structures or occupy space needed for other purposes.

It is a general object of the present invention to provide tool handling apparatus adapted to overcome all of the foregoing disadvantages and effect a tool changing operation more efficiently and in less time than mechanisms heretofore known.

A more specific object of my invention is to provide tool handling apparatus which, when used in conjunction with machine tools having a movable head, will permit a tool changing operation to be accomplished without returning the head to a predetermined reference position, and will also permit use of a tool storage member mounted independently of the machine tool head.

In furtherance of the foregoing objects, I provide novel tool handling apparatus comprising shuttle mechanism for transferring a newly selected tool from a storage matrix or the like to an intermediate tool transfer position which is in relative proximity to the spindle of an associated machine tool, and from which position the tool may be taken by tool exchange means and exchanged with an old tool in the spindle. In accordance with the present invention, as applied to a machine tool having a movable head, a tool storage matrix is mounted in a fixed position independently of the head, and the above-mentioned tool exchange means is mounted on the head for movement therewith. The shuttle mechanism is adapted to transfer a newly selected tool from the storage matrix to an intermediate tool transfer position which is in predetermined relation to the tool exchange means, so that the latter can take hold of the tool regardless of the position of the head on which the machine tool spindle and the tool exchange means are mounted. In other words, the shuttle mechanism of the present invention is adapted to transport a newly selected tool to a tool transfer position which is variable, depending upon the position of the machine tool spindle at the time a tool changing operation is to be carried out.

The shuttle mechanism which I have developed to accomplish the foregoing objectives comprises two intersecting shuttle members whereby a first shuttle member is adapted to carry a tool from the storage matrix to a second shuttle member, and the latter is adapted to carry the tool to the above-mentioned tool transfer position from which it may be exchanged with an old tool in the spindle. In accordance with the invention, the first of the two shuttle members is mounted independently of the head of the associated machine tool, while the second shuttle member is mounted on the head for movement therewith. However, while one shuttle is thus movable relative to the other, the two shuttles are constantly in intersecting relation in the sense that the first shuttle is adapted to transfer a tool to the second shuttle regardless of the position of the latter. As indicated above, the second shuttle is in a fixed position relative to the head and the machine tool spindle mounted thereon, and is thus adapted to transfer the new tool to an intermediate tool transfer position which is in a predetermined fixed relationship to the spindle.

Still another object of the invention is to provide tool handling apparatus comprising shuttle mechanism including a pot type of carrier member which is of a configuration similar to that of an associated machine tool spindle so as to be adapted to receive the shank of a tool or tool holder and be moved along a track or the like for transferring a tool from one position to another, such pot shuttle mechanism being suitable for use if desired as one of the two intersecting shuttle members described hereinabove.

These and other objects, uses and advantages of the invention will be apparent from the following description thereof, taken together with the accompanying drawings in which:

FIGURE 1 is a somewhat diagrammatic perspective view, partly broken away, illustrating automatic tool handling apparatus embodying shuttle mechanism constructed in accordance with the present invention;

FIGURE 2 is a top plan view of the tool changing system of FIGURE 1; and

Figure 3:
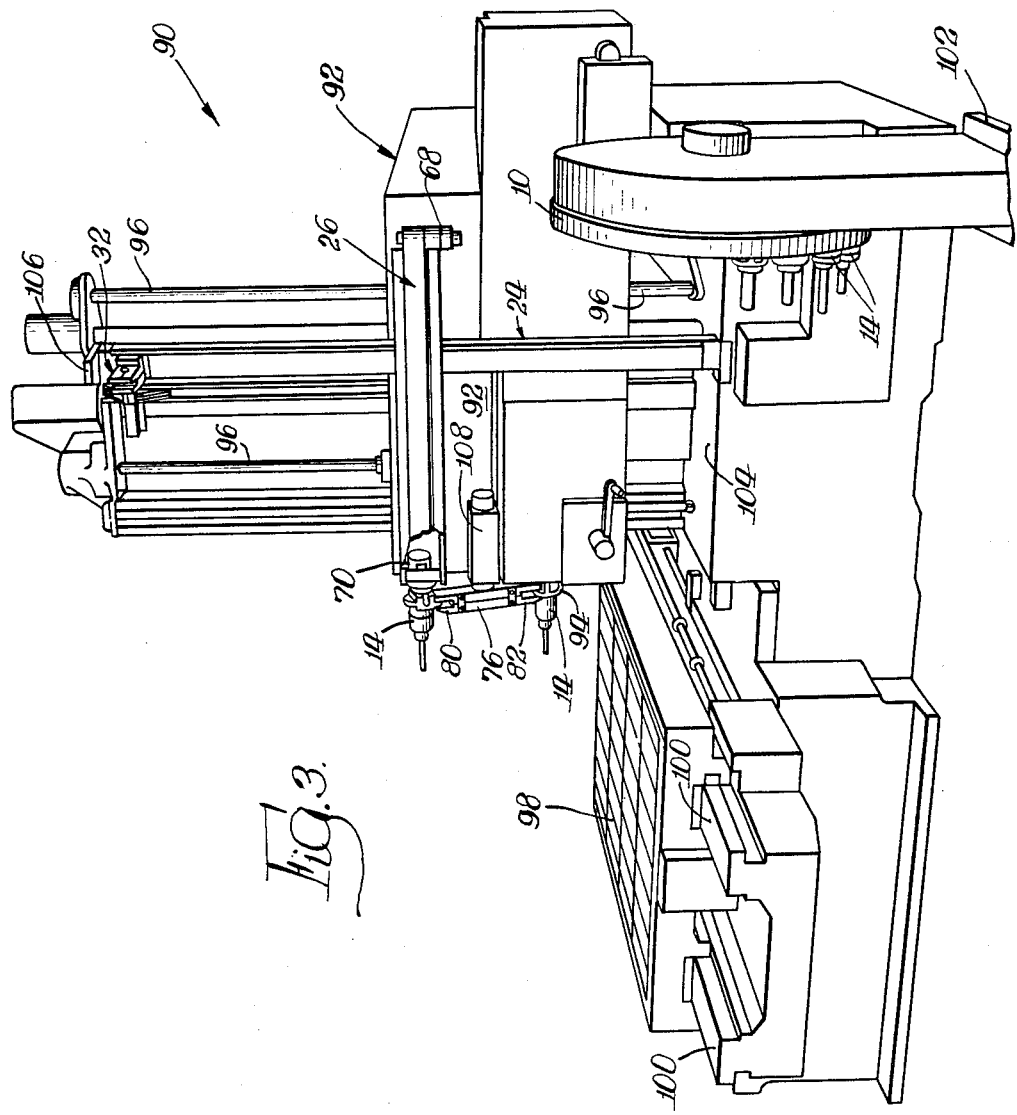
FIGURE 3 is a perspective view showing the structure of FIGURE 1 adapted for use in conjunction with a horizontal boring, drilling and milling machine of the type having a vertically movable head.

It should be understood that when reference is made herein or in the appended claims to a "tool" or a "tool holder," such terms are used interchangeably, and are also meant to include work pieces, since it will be readily apparent that any gripping portion or shank portion which is formed on a tool holder to cooperate with a gripper or tool carrier member may, if desired, be formed directly on a tool or on a work piece which is to be transported from one position to another.

Referring now to the drawings, FIGURE 1 shows a fragmentary portion of a tool storage member or matrix 10, which may for example comprise a large circular disc-shaped magazine having a plurality of circumferentially spaced tool sockets 12. The matrix 10 may be rotated about its own horizontal axis to position a selected one of the sockets 12 in a predetermined position for insertion or removal of a tool. For example, the socket indicated at 12' in the embodiment being described is in a position to receive a tool from the tool handling apparatus associated therewith.

It will be noted that a pair of tool holders 14 are shown mounted in respective sockets 12 in the matrix, and that each of the tool holders carries a cutting tool such as indicated at 15 and 16. The tool holders 14 have formed thereon generally radial flange portions 18 suited for cooperation with corresponding gripping members for transporting the tool holders. Tool holders of this type are fully described in the copending application which I filed jointly with Bernard R. Better entitled Apparatus and Method For Automatic Tool Changing, Serial No. 178,060, filed March 7, 1962. Also shown associated with the matrix 10 are code reading means 20 and code key and cartridge assemblies 22, which do not form a part of the present invention, and are shown merely to illustrate that mechanism is provided for controlling the rotational movement of the matrix 10 to regulate in a prearranged manner the order in which the various tools stored therein are delivered to the corresponding machine tool spindle.

A vertical shuttle is indicated generally at 24, and a horizontal shuttle in intersecting relation with the vertical shuttle is indicated generally at 26. Each of the shuttles 24 and 26 is adapted to transport a tool along a path parallel to the length of the shuttle, and the term "intersecting relation" is used to designate that the tool path corresponding to one shuttle intersects the tool path corresponding to the other shuttle, whereby a tool may be transferred from one shuttle to another. Accordingly, the term "intersecting" as used herein and in the appended claims should not be interpreted to mean that the tracks for the respective shuttles or their respective carrier members necessarily physically intersect one another, but only that their corresponding tool paths intersect.

The vertical shuttle 24 includes a movable carrier 28 including a carrier base portion 30 and a gripping member 32 mounted on the base portion. The carrier base 30 is provided with a pair of rollers 34 adapted to move in tracks formed by a pair of vertical U-shaped beams or rails 36 and 38, the latter two members being joined by a third wall or housing member 40 having a U-shaped portion 41 for housing a chain 42 adapted to drive the carrier 28 upwardly and downwardly along the tracks 36 and 38. A motor is shown at 43 for driving the endless chain 42, the carrier 28 being secured to the chain by any suitable connecting means (not shown).

In the embodiment being described, the upper end of the shuttle 24 is provided with a top plate 44 having an upwardly projecting shaft or journal member 46 adapted to rotate in a bearing formed in a fixed mounting bracket 48. The lower end of the shuttle may be similarly mounted for rotation in a fixed bracket 50. It will thus be seen that in the particular embodiment being described the shuttle 24 is adapted to rotate about a vertical axis. Motor means for effecting limited rotation in the manner described is shown at 52, whereby the vertical shuttle including the gripping member 32 may be rotated for the purpose of bringing the gripping member into a position wherein it is adapted to deliver a tool to the matrix 10 or remove a tool therefrom.

The gripping member 32 comprises a pair of jaws 54 and 55 connected by a cross member 56, one of the jaws being fixed relative to the cross member and the other pivotally associated therewith whereby the jaws are movable between open positions wherein they are adapted to encompass a flange gripping portion 18 on a tool holder 14 and a closed position wherein they are adapted to clamp a flange portion 18 therebetween for transferring a tool from one position to another. A hydraulic cylinder 58 is shown for controlling the operation of the jaws 54 and 55 which are preferably biased to closed position by compression spring means (not shown).

It will now be understood that the vertical shuttle 24 is adapted to remove a tool from the matrix 10 and transfer the tool to the horizontal shuttle 26. In the embodiment being described, the matrix tool transfer position is shown at 12', and thus the matrix 10 is rotated until the socket 12 carrying the tool which is to be transferred to a corresponding machine tool spindle is in the position shown at 12'. In order for the gripping member 32 to remove such a tool from the matrix, the gripping member must first be rotated about a vertical axis until the jaws 54 and 55 are in the plane of a flange gripping surface 18 on a tool holder in the socket position 12', such rotation being accomplished while the gripper is above the tool holder.

In the present instance, as described above, the entire vertical shuttle 24 is rotated in the brackets 48 and 50 by the drive means 52, after which the drive motor 43 is actuated to move the gripper 32 downwardly until the open gripper jaws 54 and 55 encompass the flange 18 on the tool holder to be transferred. The hydraulic cylinder 58 is then actuated to close the gripper jaws, and the drive means 52 is again actuated to rotate the shuttle 24 back to the position shown in FIGURE 1, thus removing the selected tool from the matrix, whereby the selected tool holder will be held in the position indicated at 14' in FIGURE 1.

It should be understood, however, that the gripper 32 may be rotated independently of the shuttle 24, rather than the entire vertical shuttle rotated, during removal of a tool from the matrix. Also, depending upon the position of the matrix, rotation of the gripper or vertical shuttle may be dispensed with entirely. That is, in some instances it may be possible to remove a tool from the matrix 10 by effecting only linear movements of the gripper member 32.

With the newly selected tool held in the position shown at 14' in FIGURE 1, the next step is to transfer the tool to the horizontal shuttle 26. The track portion of the shuttle 26 may be substantially the same as that for he shuttle 24, and thus there are shown horizontal rails or track elements 60 and 62 for cooperating with a pair of rollers (not shown) mounted on a carrier base 64. There is also shown a housing member 66 adapted to house an endless chain drive for the carrier base 64, a motor for the chain drive being indicated at 68. Accordingly, the carrier member 64 may be driven along the horizontal track elements 60 and 62 in substantially the same manner as described with respect to the vertical shuttle 24.

The carrier base 64 has mounted thereon a pot carrier member 70 having a socket 72 formed therein. The socket 72 in the pot 70 is formed so as to be adapted to receive a shank portion 73 of a tool holder 14. In other words, the pot tool carrier 70 is adapted to receive a tool or tool holder in much the same manner as the corresponding machine tool spindle, except that the pot carrier need only have a simple spring latch mechanism or the like (not shown) to retain a tool holder therein, rather than an elaborate chucking device, since it holds the tool only while the latter is being transferred from one position to another, and not while the tool is engaged in a machining operation.

In order to effect a transfer of a newly selected tool from the vertical shuttle 24 to the horizontal shuttle 26, the pot carrier 70 must first be positioned rearwardly of the vertical shuttle, such as in the position shown at 70' in FIGURE 2. The drive motor 43 for the vertical shuttle 24 is then energized to operate the chain drive 42 and thereby raise the tool holder held in the gripper 32 from the position shown at 14' in FIGURE 1 to the position shown in dotted lines at 14'', whereby the tool holder will be in axial alignment with the pot carrier 70. The drive motor 68 for the horizontal shuttle 26 is then energized to move the pot carrier 70 forwardly from the position shown at 70' to the position shown at 70'' wherein the shank 73 of the tool holder is received within the pot 70 and held therein by suitable latching means (not shown).

With the newly selected tool held in the pot carrier 70, the gripper 32 is released by operation of the cylinder 58, and the carrier 30 and gripper 32 of the vertical shuttle are raised to the upper limit of their travel by operation of the shuttle drive motor 43, after which the drive motor 68 for the horizontal shuttle 26 is energized to bring the pot carrier forwardly to the position shown in solid lines and indicated at 70 in FIGURES 1 and 2. This position may be referred to as an intermediate tool transfer position, since at this stage in the tool changing cycle the tool is adapted to be gripped by tool exchange means and exchanged with an old tool in a machine tool spindle.

A fragmentary portion of a machine tool spindle is shown at 74, and tool exchange means is providing between the spindle 74 and the intermediate tool transfer position. Such tool exchange means comprises a transfer arm 76 mounted on a rotatable shaft 78. The transfer arm has gripping members 80 and 82 at its respective ends which are adapted to cooperate with the flange gripping portions 18 on the tool holders 14. The transfer arm 76 and mechanism for rotating the arm, moving it axially, and operating the transfer arm grippers 80 and 82, are fully described in the copending application of Edward Hain, Serial No. 206,938, filed July 2, 1962, now Patent No. 3,129,506, and assigned to the assignee of the present invention.

The transfer arm 76 is movable axially through a short stroke, as well as being rotatable, and is normally maintained in a neutral position wherein it is disposed at the rearward end of its axial stroke and is rotated to a vertical position or at least to a position other than horizontal. When the transfer arm 76 is thus disposed rearwardly, its gripper members 80 and 82 will be in the plane of the flange gripping portions 18 on a tool holder in the spindle 74, as well as the flange gripping portions on a newly selected tool being held in the pot carrier 70 at the intermediate tool transfer position. Furthermore, with the arm 76 disposed vertically, it will not interfere with the operation of the tool in the spindle or with the operation of the pot carrier 70 in bringing a tool forwardly to the intermediate tool transfer position.

In order to exchange the new tool and the old tool, the transfer arm 76 is rotated to a horizontal position so that its gripper members 80 and 82 encompass respectively a flange gripping portion 18 on an old tool in the spindle 74 and a flange gripping portion 18 on a new tool in the pot carrier 70, after which the grippers are closed and the transfer arm is moved axially forwardly through a short stroke to the position shown in FIGURE 1. The transfer arm is then rotated 180 degrees and returned to its axially rearward position whereby the newly selected tool is inserted in the spindle 74 and the old tool is inserted into the pot carrier 70. It will thus be seen that the tool exchange function can be carried out by the transfer arm while both the spindle 74 and the pot carrier 70 remain stationary in the positions shown in solid lines in FIGURE 1.

Thereafter, the shuttle motor 68 is energized to return the pot carrier 70 to the position shown in dotted lines at 70'', and the shuttle motor 43 is then energized to bring the gripper 32 on the vertical shuttle 24 downwardly until the gripping jaws 54 and 55 encompass a flange gripping portion 18 on the old tool holder, after which the jaws are closed by the cylinder 58. The pot carrier 70 is then moved to its rearward position as shown in dotted lines at 70', the carrier 30 and gripper 32 on the vertical are lowered, and the vertical shuttle is rotated by the motor 52 to return the old tool to an empty socket 12 in the matrix 10.

The intersecting shuttle members 24 and 26 may be utilized in conjunction with a machine tool of the type having a movable head to effect numerous important advantages. In such a case, the spindle 74 would of course be mounted on the machine tool head for movement therewith, for example, movement vertically along the length of the shuttle 24, or movement horizontally along the path of the shuttle 26, or both, and the transfer arm 76 would also be mounted on the head. In accordance with the present inventive teaching, the horizontal shuttle 26 is also carried on the head, whereby regardless of the position of the head at a time when it is desired to effect a tool changing operation, the shuttle 26 will be adapted to carry a newly selected tool to an intermediate tool transfer position in predetermined relation to the transfer arm 76, whereby the latter will be able to exchange the new tool with an old tool in the spindle 74.

In an application of the type described above, the vertical shuttle 26 is mounted independently of the machine tool head, and is normally stationary (except for the possibility that it may be pivotable about a vertical axis, if desired, or otherwise movable, to accomplish transfer of tools to and from the matrix 10). FIGURE 1 is provided with appropriately directed arrows to indicate that the shuttle 26 may be moved vertically, or forwardly and rearwardly along a horizontal path, or both, but the two shuttles 24 and 26 are arranged so that regardless of the position of the movable shuttle 24, they are always in intersecting relation in the sense that the vertical shuttle is adapted to transfer a tool to the horizontal shuttle. Thus, the vetrical shuttle 24 must be of such a length that it will intersect the horizontal shuttle 26 whether the latter is in its uppermost or lowermost position, or in an intermediate vertical position. Similarly, the horizontal shuttle 26 must be of such a length that it will intersect the vertical shuttle 24 whether the shuttle 26 is in its extreme forward position or its extreme rearward position, or in an intermediate horizontal position.

When a pair of intersecting shuttles are utilized to transfer tools to and from a machine tool in accordance with the present invention, the matrix 10 may of course be mounted independently of the head. This is an important advantage since the matrix may weigh several thousand pounds and it is highly desirable to be able to mount it on a fixed support, rather than have it mounted on the head for movement with the latter. In addition, it will be understood that it is not necessary to return the machine tool head to a predetermined reference position in order to change tools, since the shutter 26 will move with the head, and the shuttle 24 will constantly be in intersecting relation with the shuttle 26 so as to be adapted to take a tool from the matrix and transfer it to the shuttle 26, regardless of the vertical or horizontal position of the latter. The shuttles 24 and 26 may be operated to transport a newly selected tool from the matrix to the intermediate tool transfer position while the tool in the spindle is engaged in a machining operation, in which case the tool exchange function may be carried out quickly as soon as the spindle is stopped.

Regarding a system of controls for the shuttle mechanism, I have not described such a system since those skilled in the art will readily understand that known forms of automatic control mechanism may be utilized to regulate the operation of the shuttle drive means. For example, with respect to the vertical shuttle 24, when the carrier 30 and gripper 32 are being lowered in order to deliver a tool to the matrix 10, they may be stopped in the lowermost position, as shown in solid lines in FIGURE 1, by means of a limit switch associated with the drive motor 43. Similarly, after the shuttle 24 has delivered a newly selected tool to the horizontal shuttle 26, at which time the shuttle 24 is normally raised, it may be moved to the upper end of the vertical shuttle track and stopped at the top thereof by means of a limit switch or the like.

With respect to the transfer of a tool from the vertical shuttle 24 to the horizontal shuttle 26, the carrier 30 and gripper 32 on the vertical shuttle must be stopped when they reach the height of the horizontal shuttle, even though the height of the latter will vary where it is carried on a vertically movable machine tool head. However, it will be understood that a limit switch arrangement may be used to stop the vertical shuttle when it reaches the horizontal shuttle. Alternatively, the shuttles may be constructed so that a projecting portion on the vertical shuttle carrier 30 will physically abut a corresponding portion on the horizontal shuttle so as to stall the shuttle drive motor 43 and thereby stop the vertical shuttle at the proper transfer position.

It is important to note that the intersecting shuttle mechanism of the present invention, and also the use of a pot carrier on a shuttle member as taught herein, are adapted for numerous and varied useful applications in the automatic tool changing field. In this respect, it will readily be understood that the respective shuttles need not necessarily be disposed horizontally and vertically, nor is it necessary that they be perpendicular to one another. They may in fact both be stationary and be used in conjunction with a machine tool having a stationary head, although they offer the greatest advantages when used with a machine tool having a movable head. The important factor is that the two shuttles must be in intersecting relationship so that one is adapted to pass a tool to the other, and this relationship must be maintained even when one shuttle is movable relative to the other.

The pot carrier 70 which is usable in conjunction with or as one element of a shuttle member is also an important feature of the present invention. The pot carrier provides an extremely useful means for receiving the shank of a tool or tool holder for the purpose of transporting the latter, and loading of a tool into the pot carrier and removing a tool therefrom can be effected with unusual facility. In addition, it will be noted since the pot carrier is adapted to receive and hold a tool in substantially the same manner as a machine tool spindle, it is possible to exchange an old tool in a spindle with a newly selected tool held in the pot carrier by simultaneously removing a tool from each and simultaneously inserting a tool in each, without the necessity for moving either the spindle or the pot carrier during the tool exchange operation. The transfer arm 76 comprises one suitable mechanism for effecting such a tool exchange operation, but such mechanism is described merely by way of example, and various other types of tool exchange means may be utilized in conjunction with the intersecting shuttle mechanism.

FIGURE 3 shows the manner in which the present invention may be utilized in conjunction with a horizontal boring, drilling and milling machine 90 of the type having a vertically movable head 92. The machine 90 is of a type well known in the art having a spindle 94 mounted on the head 92 and movable vertically therewith, the entire head assembly being movable along guide rods 96.

In FIGURE 3, elements corresponding to the embodiment of FIGURES 1 and 2 are identified with corresponding reference numerals. Thus, there is shown the matrix 10 for storing a plurality of tools, a vertical shuttle 24 having a gripper member 32, a horizontal shuttle 26 having a pot carrier 70, and a tool exchange means or transfer arm 76 having gripper members 80 and 82 at its respective ends. There is also shown a work table 98 movable laterally on slides 100.

In accordance with the present inventive teaching, the rotatable matrix 10 is mounted on a stationary support 102. The vertical shuttle 24 is also mounted on stationary supports, the lower end thereof being supported at a stationary base portion 104, and the upper end being supported at a fixed upright support 106. In FIGURE 3, the shuttle 24 is not actually shown as being rotatable, but if desired it may be mounted in a rotatable fashion in the same manner as shown in FIGURE 1, or the gripper member 32 may be made rotatable independently of the shuttle 24. Alternatively, means may be provided for moving the gripper member 32 linearly towards and away from the matrix 10 in order to insert tools in the matrix and remove tools therefrom when the shuttle gripper is at the lower end of its track. The particular showing of the matrix 10 in FIGURE 3 corresponds to the latter alternative, since in contrast to the embodiment of FIGURES 1 and 2 the matrix is shown oriented in such a manner as to hold the various tools in parallel relation to a tool in the spindle or a tool being transported by one of the intersecting shuttles.

In applying the invention to a horizontal boring, drilling and milling machine of the type shown, the horizontal shuttle 26 is mounted on the head 92 so as to be movable vertically therewith, and the tool exchange means or transfer arm 76 and mechanism 108 for actuating the same are similarly mounted on the head 92. The vertical shuttle 24 is adapted to remove a newly selected tool from the matrix 10 and carry the tool upwardly to the horizontal shuttle 26 mounted on the head 92. The pot carrier 70 or such other carrier means as may be employed on the horizontal shuttle 26 is actuated to take the tool from the vertical shuttle, and gripper 32 is then moved to the upper limit of its travel while the pot carrier 70 is moved forwardly to carry the tool to the intermediate tool transfer position, whereby it may be exchanged with an old tool in the spindle 94 by the tool exchange means 76 mounted on the head 92.

The foregoing structure is adapted to effect an automatic tool changing operation regardless of the height of the machine tool head 92, while permitting the matrix 10 to be mounted in a fixed position independently of the head. It will further be noted that the intersecting shuttles 24 and 26 would be adapted to perform such a function, even if the head 92 were movable forwardly and rearwardly along a horizontal path, as well as being movable vertically, the essential requirement being that the movable shuttle 26 be of sufficient length so as to intersect the vertical shuttle regardless of the horizontal position of the head.

While certain preferred forms of my invention have been described and illustrated, it will be appreciated that modifications and changes may be made therein by those skilled in the art, particularly with my disclosure before them, and thus I do not intend to be limited to the particular disclosure, except insofar as the appended claims are so limited.

I claim:

1. In an automatic tool changing system for use in conjunction with a machine tool having a head on which a spindle is mounted, which system includes a tool storage member mounted independently of said head and tool transfer means mounted on said head for taking a newly selected tool disposed in an intermediate tool transfer position and transporting the same to said spindle, the improvement comprising shuttle means including a first rectilinear shuttle track member having first carrier means movable along said track for gripping a tool selected from said storage member and transporting said tool along a first rectilinear path, a second rectilinear shuttle track member having second carrier means movable along said track for receiving said tool from said first carrier means and transporting said tool along a second rectilinear path to an intermediate tool transfer position for transfer to said tool transfer means, said second path being in intersecting relation with said first path whereby a tool may be transferred between said first movable carrier means and said second movable carrier means, and drive means associated with each of said carrier means for moving a carrier in either direction along its corresponding track.

2. In an automatic tool changing system for use in conjunction with a machine tool having a head on which a spindle is mounted, which system includes a tool storage member mounted independently of said head and tool transfer means mounted on said head for taking a newly selected tool disposed in an intermediate tool transfer position and transporting the same to said spindle, the improvement comprising shuttle means including a first rectilinear shuttle track member having first carrier means movable along said track for gripping a tool selected from said tool storage member and transporting said tool along a first rectilinear path, a second rectilinear shuttle track member having second carrier means including a pot carrier movable along said track, said pot carrier having a socket for receiving a shank portion of a tool held by said first carrier means and transporting said tool along a second rectilinear path to an intermediate tool transfer position for transfer to said tool transfer means, said second path being in intersecting relation with said first path whereby a tool may be transferred between said first movable carrier means and said movable pot carrier, and drive means associated with each of said carrier means for moving a carrier in either direction along its corresponding track.

3. In an automatic tool changing system for use in conjunction with a machine tool having a head on which a spindle is mounted, which system includes a tool storage member mounted independently of said head for storing a plurality of tools, and tool transfer means mounted on said head for taking a newly selected tool disposed in an intermediate tool transfer position and transporting the same to said spindle, said tools being of the type having a shank portion and also a generally radial flange portion or the like with at least one flange gripping surface thereon, the improvement comprising shuttle means including a first rectilinear shuttle track member having first carrier means movable along said track, said first carrier means having gripping means for engaging a flange gripping surface on a tool selected from said tool storage member and transporting said tool along a first rectilinear path, a second rectilinear shuttle track member having a second carrier means including a pot carrier movable along said track, said pot carrier having a socket for receiving a shank portion of a tool held by said gripping means and transporting said tool along a second rectilinear path to an intermediate tool transfer position for transfer to said tool transfer means, said second path being in intersecting relation with said first path whereby a tool may be transferred between said gripping means and said pot carrier, and drive means associated with each of said carrier means for moving a carrier in either direction along its corresponding track.

4. In an automatic tool changing system for use in conjunction with a machine tool of the type having a movable head which system is adapted for transferring tools between a storage member mounted independently of said head and a machine tool spindle mounted on said head, the improvement comprising shuttle means including a first shuttle member having first movable carrier means thereon adapted to transport a tool along a first linear path, and a second shuttle member mounted on the movable head of the corresponding machine tool for movement therewith, said second shuttle member having second movable carrier means thereon adapted to carry a tool along a second linear path which is in intersecting relation with said first linear path whereby a tool may be transferred between said first movable carrier means and said second movable carrier means regardless of the position of the head on which said second shuttle is mounted.

5. The invention of claim 4 wherein said machine tool head is movable vertically and wherein said first shuttle is of such a length that said first linear path will intersect said second linear path regardless of the vertical position of said head on which said second shuttle is mounted.

6. The invention of claim 4 wherein said machine tool head is movable both vertically and horizontally and wherein said first and second shuttles are of sufficient length that said first linear path will intersect said second linear path regardless of the vertical and horizontal position of said head on which said second shuttle is mounted.

7. The invention of claim 4 wherein said first shuttle is disposed vertically and said second shuttle is disposed horizontally.

8. The invention of claim 4 wherein said second movable carrier means includes a pot carrier having a socket adapted to receive a shank portion of a tool for transporting the same along said second linear path.

9. In an automatic tool changing system for use in conjunction with a machine tool of the type having a movable head on which a spindle is mounted, which system includes a tool storage member mounted independently of said head and tool exchange means mounted on said head for exchanging a newly selected tool in an intermediate tool transfer position with an old tool in said spindle, the improvement comprising shuttle means including a first shuttle member having first carrier means thereon adapted to grip a tool selected from said tool storage member and transport said tool along a first linear path, and a second shuttle member mounted on the movable head of the corresponding machine tool for movement therewith, said second shuttle member having second movable carrier means thereon adapted to receive said tool from said first carrier means and transport said tool along a second linear path to an intermediate tool transfer position for transfer to said tool exchange means, said second linear path being in intersecting relation with said first linear path whereby a tool may be transferred between said first carrier means and said second carrier means regardless of the position of the movable head on which said second shuttle is mounted.

10. The invention of claim 9 wherein said first shuttle is disposed vertically and said second shuttle is disposed horizontally.

11. The invention of claim 9 wherein said second movable carrier means includes a pot carrier having a socket adapted to receive a shank portion of a tool for transporting the same along said second linear path.

12. In an automatic tool changing system for use in conjunction with a machine tool of the type having a movable head on which a spindle is mounted which system includes a tool storage member mounted independently of said head and tool exchange means mounted on said head for exchanging a newly selected tool in an intermediate tool transfer position with an old tool in said spindle, and wherein said tools are of the type having a shank portion and also a generally radial flange portion or the like with at least one flange gripping surface thereon, the improvement comprising shuttle means including a first shuttle member having first movable carrier means thereon including gripping means adapted to engage a flange gripping surface on a tool selected from said tool storage member for transporting said tool along a first linear path, and a second shuttle member mounted on the movable head of the corresponding machine tool for movement therewith, said second shuttle member having second movable carrier means thereon adapted to receive said tool from said first carrier, said second carrier means including a movable pot carrier having a socket adapted to receive the shank portion of said tool for transporting the same along a second linear path to an intermediate tool transfer position for transfer to said tool exchange means, said second linear path being in intersecting relation with said first linear path whereby a tool may be transferred between said gripping means and said pot carrier regardless of the position of the movable head on which said second shuttle is mounted.

13. An automatic tool changing system for use in conjunction with a machine tool of the type having a movable head on which a spindle is mounted, comprising, in combination, a tool storage member mounted on a stationary support independently of the movable head of the corresponding machine tool, tool exchange means mounted on said movable head for exchanging a newly selected tool in an intermediate tool transfer position with an old tool in said spindle, a first shuttle member having first carrier means thereon adapted to grip a tool selected from said tool storage member and transport said tool along a first linear path, and a second shuttle member mounted on said movable head for movement therewith, said second shuttle member having second movably carrier means between adapted to receive said tool from said first carrier means and transport said tool along a second linear path to an intermediate tool transfer position for transfer to said tool exchange means, said second linear path being in intersecting relation with said first linear path whereby a tool may be transferred between said first carrier means and said second carrier means regardless of the position of the movable head on which said second shuttle is mounted.

14. The invention of claim 13 wherein said second movable carrier means includes a pot carrier having a socket formed therein adapted to receive a shank portion of a tool for transporting the same along said second linear path.

15. In an automatic tool changing system for use in conjunction with a machine tool for transferring tools between a storage member and a machine tool spindle, said tools being of the type having a shank portion and also a generally radial flange portion or the like with at least one flange gripping surface thereon, the improvement comprising, in combination, shuttle track means, carrier means mounted on said track for movement thereon along a rectilinear path, said carrier means including a pot carrier having a socket formed therein which receives a shank portion of a tool for transporting the same along said rectilinear path, drive means for moving said pot carrier in either direction along said track, and tool transfer means having gripping means thereon which engages a flange gripping surface on a tool disposed in said pot carrier and removes the tool therefrom.

16. The invention of claim 15 in combination with a machine tool of the type having a movable head wherein said shuttle track means is mounted on said head for movement therewith.

17. In an automatic tool changing system for use in conjunction with a machine tool for transferring tools between a storage member and a machine tool spindle, said tools being of the type having a shank portion and also a generally radial flange portion or the like with at least one flange gripping surface thereon, the improvement comprising, in combination, shuttle track means, carrier means mounted on said track for movement thereon along a rectilinear path, said carrier means including a pot carrier having a socket formed therein which receives a shank portion of a tool selected from the storage member for transporting the tool along said rectilinear path to an intermediate tool transfer position, drive means for moving said pot carrier in either direction along said track, and a rotatable and axially movable transfer arm having gripping means thereon which engages a flange gripping surface on a tool disposed in said pot carrier in said intermediate tool transfer position and transfers the tool to said spindle.

18. In an automatic tool changing system for use in conjunction with a machine tool or the like for transferring tools between a storage member and a machine tool spindle, the improvement comprising shuttle means including a first shuttle track member having first movable carrier means thereon adapted to transport a tool along a first rectilinear path, and a second shuttle track member having second movable carrier means thereon adapted to transport a tool along a second rectilinear path, said second path being in intersecting relation with said first path, and said second shuttle track member being movable relative to said first shuttle track member while maintaining said first and second paths in intersecting relation, whereby a tool may be transferred between said first movable carrier means and said second movable carrier means regardless of the relative position of said first and second track members.

References Cited in the file of this patent
UNITED STATES PATENTS

| | | |
|---|---|---|
| 1,593,825 | Higgins | July 27, 1926 |
| 1,704,342 | Redpath | Mar. 5, 1929 |
| 3,052,011 | Brainard | Sept. 4, 1962 |

UNITED STATES PATENT OFFICE
CERTIFICATE OF CORRECTION

Patent No. 3,161,951                                          December 22, 1964

Myron L. Anthony

It is hereby certified that error appears in the above numbered patent requiring correction and that the said Letters Patent should read as corrected below.

Column 11, line 58, for "movably" read -- movable --; line 59, for "between" read -- thereon --.

Signed and sealed this 20th day of July 1965.

(SEAL)
Attest:

ERNEST W. SWIDER
Attesting Officer

EDWARD J. BRENNER
Commissioner of Patents